(12) United States Patent
Park et al.

(10) Patent No.: US 9,113,433 B2
(45) Date of Patent: Aug. 18, 2015

(54) METHOD AND APPARATUS FOR DISTRIBUTING RANDOM ACCESS IN A WIRELESS ACCESS SYSTEM

(75) Inventors: Gi Won Park, Anyang-si (KR); Young Soo Yuk, Anyang-si (KR)

(73) Assignee: LG Electronics Inc., Seoul (KR)

(*) Notice: Subject to any disclaimer, the term of this patent is extended or adjusted under 35 U.S.C. 154(b) by 100 days.

(21) Appl. No.: 13/988,726

(22) PCT Filed: Nov. 24, 2011

(86) PCT No.: PCT/KR2011/009013
§ 371 (c)(1),
(2), (4) Date: May 21, 2013

(87) PCT Pub. No.: WO2012/070879
PCT Pub. Date: May 31, 2012

(65) Prior Publication Data
US 2013/0244652 A1    Sep. 19, 2013

Related U.S. Application Data

(60) Provisional application No. 61/417,224, filed on Nov. 25, 2010.

(51) Int. Cl.
| H04W 4/00 | (2009.01) |
| H04W 74/08 | (2009.01) |
| H04W 60/00 | (2009.01) |
| H04W 74/00 | (2009.01) |
| H04W 48/12 | (2009.01) |

(52) U.S. Cl.
CPC ............ *H04W 60/00* (2013.01); *H04W 74/002* (2013.01); *H04W 4/005* (2013.01); *H04W 48/12* (2013.01); *H04W 74/0833* (2013.01)

(58) Field of Classification Search
USPC ........... 370/312, 230, 252; 455/458, 515, 434
See application file for complete search history.

(56) References Cited

U.S. PATENT DOCUMENTS

| 8,280,399 B2 | 10/2012 | Kang et al. |
| 2004/0146019 A1* | 7/2004 | Kim et al. ................ 370/329 |
| 2005/0058058 A1* | 3/2005 | Cho et al. ................ 370/208 |
| 2006/0009242 A1* | 1/2006 | Ryu et al. ................ 455/458 |
| 2007/0168577 A1 | 7/2007 | Kim et al. |
| 2009/0197599 A1* | 8/2009 | Cho et al. ................ 455/434 |

(Continued)

FOREIGN PATENT DOCUMENTS

| KR | 10-2008-0079961 A | 9/2008 |
| KR | 10-2009-0062484 A | 6/2009 |
| WO | 2008/105640 A2 | 9/2008 |

OTHER PUBLICATIONS

A Novel Mechanism for Contention-based Initial Ranging in IEEE 802.16e Networks by Chi et al, dated 2008.*

(Continued)

*Primary Examiner* — Daniel Lai
(74) *Attorney, Agent, or Firm* — Dentons US LLP

(57) ABSTRACT

The present description relates to a method in which a terminal performs network reentry procedures in an idle mode in a wireless access system, wherein the method comprises the following steps: receiving, from a base station, control information indicating an initial ranging back-off window size for machine-to-machine (M2M) terminals during a paging listening period; determining an initial ranging back-off window size for initial ranging using the received control information; and performing initial ranging procedures with the base station based on the determined initial ranging back-off window size.

10 Claims, 7 Drawing Sheets

(56) References Cited

U.S. PATENT DOCUMENTS

| | | | |
|---|---|---|---|
| 2009/0197601 A1* | 8/2009 | Kim et al. | 455/434 |
| 2009/0227265 A1* | 9/2009 | Kang et al. | 455/456.1 |
| 2010/0248752 A1* | 9/2010 | Yu | 455/458 |
| 2010/0279715 A1* | 11/2010 | Alanara et al. | 455/458 |

OTHER PUBLICATIONS

Shantidev Mohanty, et al., "A Novel Algorithm for Efficient Paging in Mobile WiMax", In: Proceedings of IEEE 2007 Mobile WiMax Symposium, Mar. 25-27, 2007, pp. 48-53, See Chapter I and II.

Jia Lin, et al., "Carrier for Paging and Network Re-entry in Idle Mode of Multi-Carrier," IEEE 802.16 Broadband Wireless Access Working Group, IEEE C802.16m-9/0115, Jan. 5, 2009, See Sections 2-3.

IEEE C802.16p-1110212r3; Distribution of ranging access from M2M devices during network reentry in 16REV3; Seokki, K; Jaesun, C.; Soojung, J.; Chulsik, Y.; Kwangjae, L; Sep. 21, 2011.

IEEE 802.16p-10/00018r2; IEEE Standard for local and metropolitan area networks Part 16: Air Interface for Broadband Wireless Access Systems Enhancements to Support Machine-to-Machine Applications; May 25, 2011.

* cited by examiner

METHOD AND APPARATUS FOR DISTRIBUTING RANDOM ACCESS IN A WIRELESS ACCESS SYSTEM

This Application is a 35 U.S.C. §371 National Stage Entry of International Application No. PCT/KR2011/009013 filed Nov. 24, 2011 and claims the benefit of U.S. Provisional Application No. 61/417,224; filed Nov. 25, 2010, all of which are incorporated by reference in their entirety herein.

BACKGROUND OF THE INVENTION

1. Field of the Invention

The present invention relates to a wireless access system and, more particularly, to a method and apparatus for distributing random access by mobile stations in an idle mode (in particular, M2M devices).

2. Related Art

M2M Communication (Machine Type Communication: MTC)

There are many terminals within a cell, and the terminals may be classified depending on the type, class, service type, etc of the terminal.

For example, according to an operation type of terminals, the terminals can be divided into a terminal for human type communication (HTC) and machine type communication (MTC). The MTC means a communication between devices, and has the same meaning as machine-to-machine (M2M) communication. That is, 802.16m system may use M2M communication, and LTE-(A) system may use MTC. Herein, the HTC implies a signal transmission/reception operation in which signal transmission is determined by human interventions, and the MTC implies an operation in which each device autonomously transmits a signal either periodically or in an event-driven manner without human interventions.

In addition, when the M2M communication (or MTC) is taken into consideration, the total number of terminals will increase suddenly. M2M devices or MTC devices may have the following features depending on supported service.

1. A large number of terminals within a cell
2. A small amount of data
3. Low transmission frequency (may have periodicity)
4. A limited number of data characteristics
5. Not sensitive to time delay
6. Low mobility or fixed In addition, the M2M communication or MTC can be used in various fields such as secure access and surveillance, tracing and recovery, public safety (emergency situation, disasters), payment (vending machines, ticketing machines, parking meters), healthcare, remote control, smart meters, etc.

IDLE MODE

An idle mode in an HTC environment (802.16 system) is described below in brief.

The idle mode is a mechanism in which an MS can receive a downlink broadcast message periodically without being registering with a specific BS although the MS wanders about a radio link environment in which a plurality of BSs is deployed in a wide area.

The idle mode is a state in which only downlink synchronization has been set up so that a paging message, that is, a broadcast message, can be received only at a specific interval in the state in which all normal operations including handover have been stopped. The paging message is a message that instructs an MS on a paging action. For example, the paging action includes the execution of ranging (for a location update), network reentry, etc.

FIG. 1 is a flowchart showing an operation of an idle mode MS.

The idle mode can be initiated by an MS or can be initiated by a BS. That is, an MS can enter the idle mode by transmitting a deregistration request (DREG-REQ) message to a BS and receiving a deregistration response (DREG-RSP) message, that is, a response thereto, from the BS. Furthermore, the MS can enter the idle mode when the BS transmits an unsolicited deregistration response (DREG-RSP) message or a deregistration command (DREG-CMD) message to the MS.

Referring to FIG. 1, an MS is deregistered from a BS, and the MS enters the idle mode (S110). Here, the BS can be a paging controller. If the paging controller is an additional network entity, the BS exchanges pieces of information with the paging controller over a backbone network. When the idle mode is initiated, the paging controller starts an idle mode system timer.

The idle mode system timer is a maximum time on which the paging controller can store idle mode retention information. The MS starts an idle mode timer corresponding to the idle mode system timer.

During a paging listening interval, the MS receives a DL-MAP/UL-MAP message and a DCD/UCD message (S120). The MS has to decode the DL-MAP message and the DCD message in order to decode the paging message, and the MS has to be synchronized with the downlink of a preferred BS. The DCD message includes a paging group identifier (ID) for identifying a paging group to which a BS belongs.

During the paging listening interval, the MS receives a PAG-ADV (BS broadcast paging) message, that is, the paging message (S130). Here, the PAG-ADV message indicates a paging action to be performed by the MS.

The idle mode MS can perform a location update in order to update its own location information that is stored in the paging controller. Here, the location update can be initiated by the BS or can be initiated by the MS. That is, the idle mode MS performs the location update for various reasons (S140).

When the location update is successful, the idle mode timer and the idle mode system timer are reset. If the idle mode system timer expires, the paging controller deletes the stored idle mode retention information and stops control related to paging for the corresponding MS. When the idle mode timer expires, the MS considers that the paging controller has deleted the idle mode retention information.

SUMMARY OF THE INVENTION

A network can request a network entry from a plurality of M2M devices at the same point of time or during a short period. One paging message transmitted by a BS can include group IDs that require a network entry. In this case, M2M devices corresponding to a corresponding group ID content with one another in a random access process, that is, a network reentry process. That is, if many M2M devices receive one paging message and simultaneously perform random access processes, lots of access collisions occur between the M2M devices or M2M groups.

Accordingly, the present invention provides a method of distributing random access in a process of M2M devices performing a network reentry procedure.

Furthermore, the present invention provides transmitting initial ranging back-off-related information for M2M devices to MSs in an idle mode through a paging message.

In an aspect, a method of performing, by a mobile station (MS), a network reentry procedure in an idle mode in a wireless access system is provided. The method includes receiving control information indicating an initial ranging back-off window size for machine-to-machine (M2M) devices from a base station (BS) during a paging listening interval, determining the initial ranging back-off window size for an initial ranging using the received control information, and performing the initial ranging with the BS based on the determined initial ranging back-off window size.

Further, the control information may be an initial ranging back-off start parameter.

Further, the control information may be received through a paging advertisement message (MOB_PAG-ADV or AAI_PAG-ADV).

Further, the performing the initial ranging may include transmitting an initial ranging code to the BS within the determined initial ranging back-off window size, receiving a response to the initial ranging code from the BS, receiving an assigned grant for transmitting a ranging request message (RNG-REQ) from the BS, transmitting the ranging request message to the BS based on the assigned grant, and receiving a ranging response (RNG-RSP) message as a response to the ranging request message from the BS.

Further, the initial ranging code may be randomly selected within the initial ranging back-off window size.

Further, the initial ranging code may be one of codes included in a handover (HO) ranging code set.

Further, the control information may be assigned to each M2M group.

Further, if the control information is assigned to each M2M group, the control information may indicate an initial ranging back-off window size for M2M devices belonging to an M2M group.

Further, the performing the initial ranging may include calculating a waiting time until the initial ranging back-off window size is applied, and applying the determined initial ranging back-off window size after the calculated waiting time.

Further, the waiting time may be calculated through a modulo operation of an M2M device ID and a specific value assigned by the BS.

Further, the waiting time may be a sum of an offset for each M2M group or for each M2M application type and a value of a modulo operation of an M2M device ID and a specific value assigned by the BS.

Further, the MS may be an M2M device or a machine type communication (MTC) device.

In another aspect, a mobile station (MS) for performing a network reentry procedure in an idle mode in a wireless access system is provided. The MS includes a radio frequency unit for transmitting and receiving wireless signals with an outside, and a control unit connected to the radio frequency unit. The control unit is configured for controlling the radio frequency unit to receive control information indicating an initial ranging back-off window size for machine-to-machine (M2M) devices from a base station (BS) during a paging listening interval, determining the initial ranging back-off window size for an initial ranging using the received control information, and performing the initial ranging with the BS based on the determined initial ranging back-off window size Further, the control unit may be configured for randomly selecting an initial ranging code within the initial ranging back-off window size, and controlling the radio frequency unit to transmit the selected initial ranging code to the BS.

Further, the control unit may be configured for calculating a waiting time until the initial ranging back-off window size is applied, and applying the determined initial ranging back-off window size after the calculated waiting time.

The present invention is advantageous in that random access (ranging) by idle mode MSs that perform network reentry procedures can be distributed by defining a waiting time until an initial ranging code is received after receiving a paging message.

Furthermore, the present invention is advantageous in that random access (ranging) by idle mode MSs can be distributed by transmitting initial ranging back-off-related information for M2M devices to the idle mode MSs through a paging message.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

Further, IEEE 802.16p provides a communication standard for supporting a machine type communication (MTC).

The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

For some embodiments of the present invention, a well-known structure and device may be omitted for avoiding ambiguity of the concept of the present invention. Also, some embodiments of the present invention may be shown in the form of a block diagram around essential functions of each structure and device. In addition, the same component may be described using the same reference number in drawings in the all disclosures.

Figure 1:
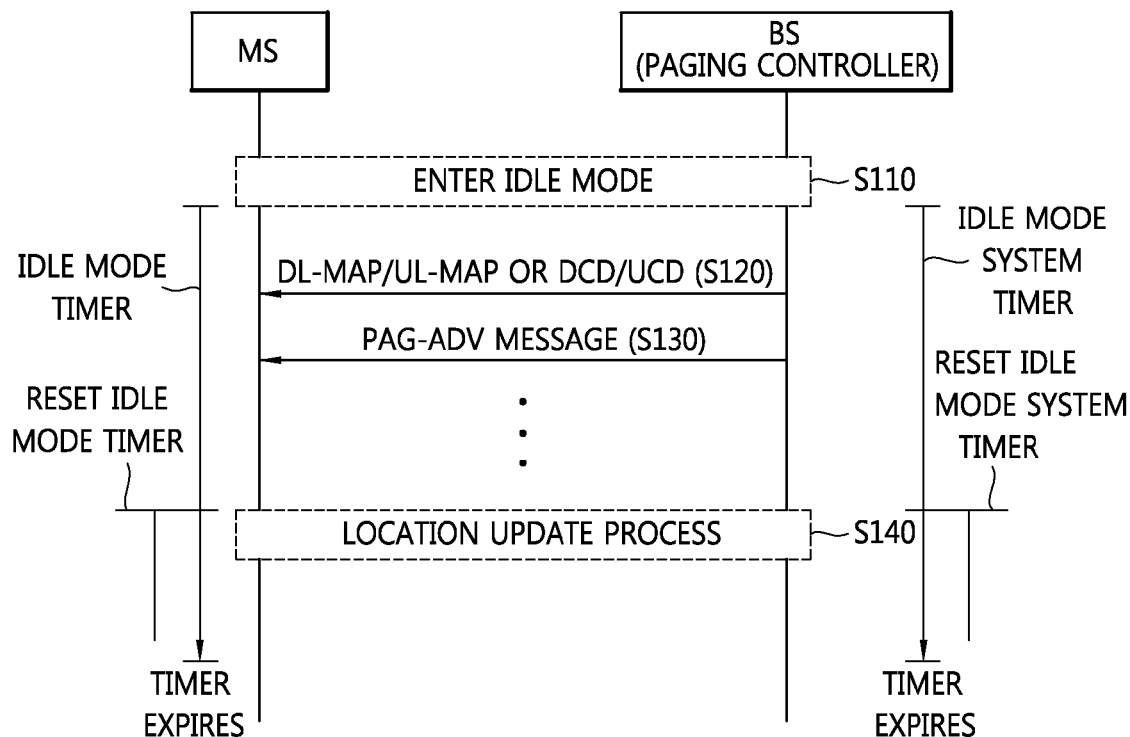
FIG. 1 is a flowchart showing an operation of an idle mode MS.
Figure 2:
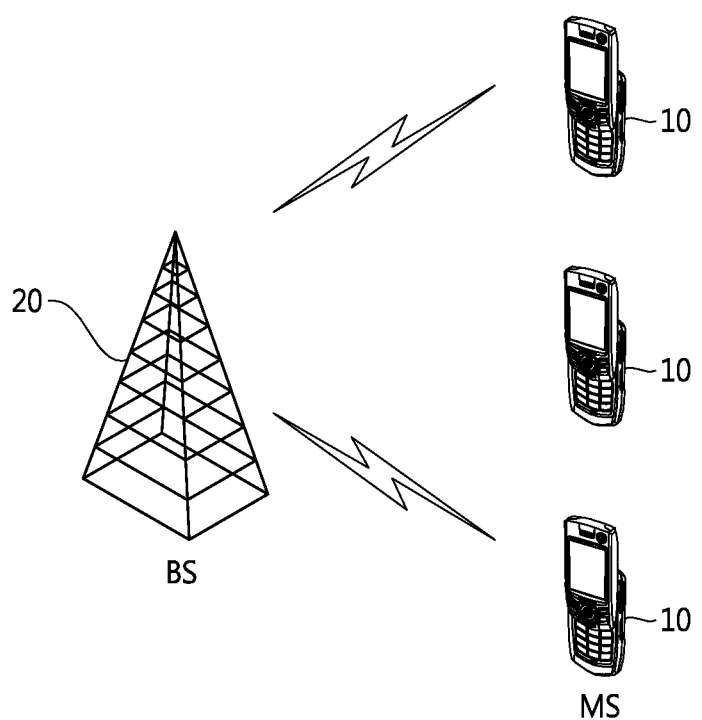
FIG. 2 is a conceptual diagram showing a wireless communication system to which an embodiment of the present invention can be applied.

FIG. 2 is a conceptual diagram showing a wireless communication system to which an embodiment of the present invention can be applied. The wireless communication systems are widely deployed in order to provide various communication services, such as voice and packet data.

Referring to FIG. 2, the wireless communication system includes mobile stations (MSs) 10 and a base station (BS) 20. The MS 10 can be fixed or mobile and may also be called another terminology, such as user equipment (UE), a user terminal (UT), a subscriber station (SS), a wireless device, or an advanced mobile station (AMS). Furthermore, the MS 10 includes a concept of an MS corresponding to MTC or M2M communication (i.e., an MTC device or an M2M device).

Meanwhile, a personal digital assistant (PDA), a cellular phone, a personal communication service (PCS) phone, a global system for mobile (GSM) phone, a wideband CDMA (WCDMA) phone, a mobile broadband system (MBS) phone, a hand-held PC, a notebook PC, a smart phone, or a multi mode-multi band (MM-MB) terminal can be used as an MS described below.

Here, the smart phone is a terminal in which advantages of an MS are mixed with advantages of a PDA, and the smart phone may mean a terminal in which schedule management and data communication functions, such as FAX transmission and reception and Internet access, that is, the functions of the PDA, are integrated into the MS. Furthermore, the MM-MB refers to a terminal is equipped with a multi-modem chip and can operate in all portable Internet systems and other mobile communication systems (e.g., a code division multiple access (CDMA) 2000 system and a wideband CDMA (WCDMA) system).

The BS 20 commonly refers to a fixed station which communicates with the MSs 10, and the BS 20 can also be called another terminology, such as a NodeB, a base transceiver system (BTS), or an access point. One BS 20 can include one or more cells.

The wireless communication system can be a system based on orthogonal frequency division multiplexing (OFDM)/orthogonal frequency division multiple access (OFDMA).

A plurality of orthogonal subcarriers is used in OFDM. OFDM employs an orthogonal characteristic between inverse fast Fourier transform (IFFT) and fast Fourier transform (FFT). A transmitter performs IFFT on data and transmits the data. A receiver reconstructs the original data by performing FFT on a received signal. The transmitter uses IFFT in order to combine multiple subcarriers, and the receiver uses corresponding FFT in order to separate the multiple subcarriers from one another.

Network Reentry Procedure in an Idle Mode

The network reentry procedure (or ranging procedure or random access procedure) of an idle mode MS (i.e., an MS that has entered an idle mode) is described below in brief.

Figure 3:
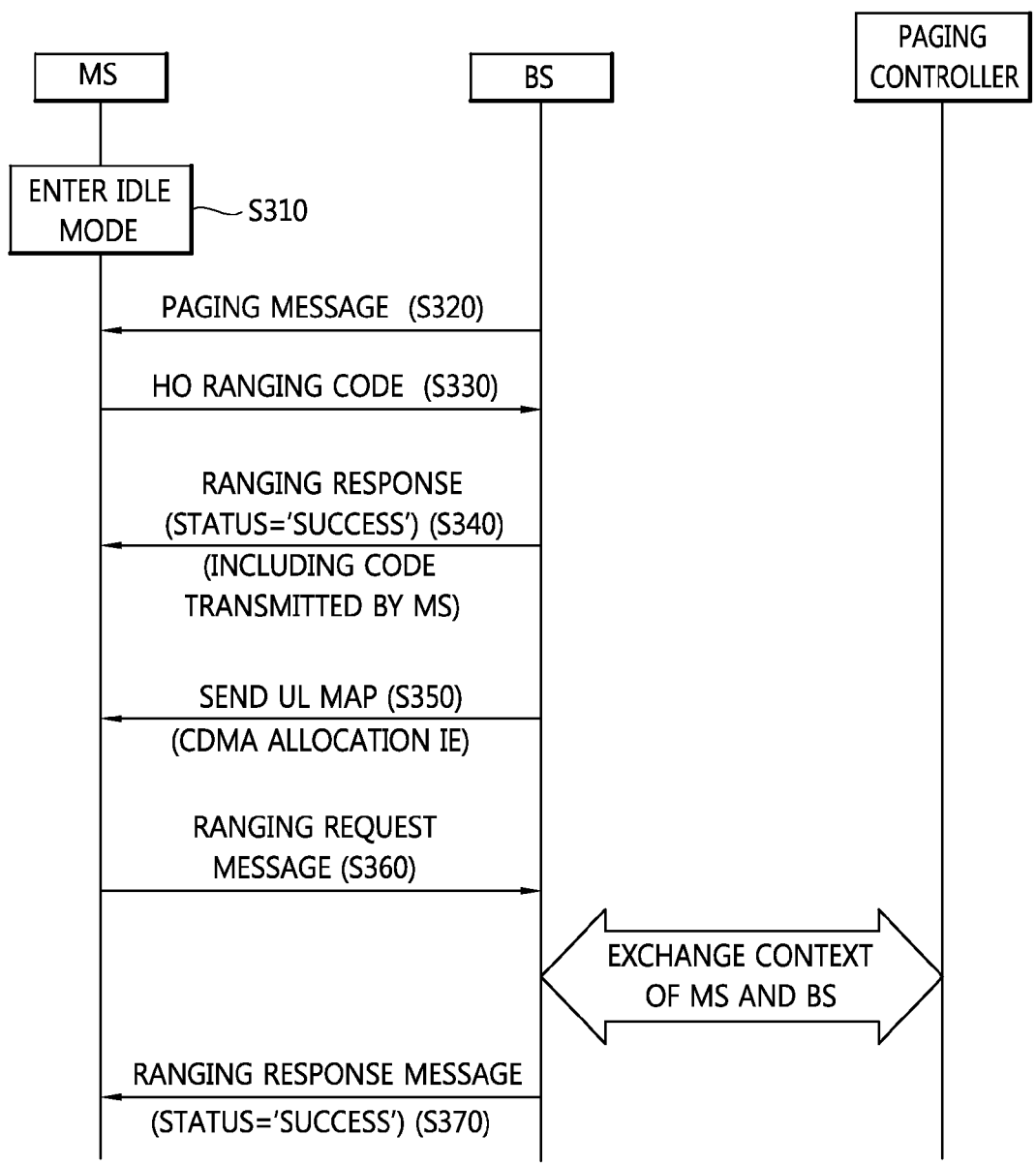
FIG. 3 is a flowchart showing a network reentry procedure of an idle mode MS.

FIG. 3 is a flowchart showing a network reentry procedure of an idle mode MS.

First, the MS performs a deregistration procedure (deregistration request/response: the transmission and reception of DREG-REQ/RSP messages) with a BS and then enters the idle mode (S310).

An MS that has entered the idle mode (or an MS in an idle mode state) is hereinafter called an 'idle mode MS', for convenience sake.

Next, during a paging listening interval, the idle mode MS receives a paging message from the BS (S320). That is, during the paging listening interval, if there is downlink data to be transmitted to the idle mode MS, the BS transmits the paging message (MOB_PAG-ADV, AAI_PAG-ADV) in which an action code has been set to '0b0' (network reentry) to the idle mode MS in order to inform the idle mode MS that the downlink date is present.

Next, the idle mode MS randomly selects one code (or two codes) from an HO ranging code set and requests ranging from the BS by transmitting the one code (or two codes) to the BS through a ranging region (S330).

More particularly, in a wideband wireless access system using an OFDMA scheme, the MS performs a ranging request and an uplink bandwidth request for adjusting an uplink transmission parameter using a CDMA code. A BS transfers a CDMA code set for ranging to MSs in a broadcast form through an uplink channel descriptor (UCD).

Here, a downlink channel descriptor (DCD) and an UCD are MAC management messages including the uplink/downlink channel parameters of a BS. The DCD and the UDC are transmitted from the BS to MSs in a broadcast form in a specific cycle.

The MSs obtains information about the coding and modulation scheme of each burst from the DCD and UCD messages and performs coding and/or decoding on data. The MS receives the DCD/UCD messages that are periodically transmitted, determines whether or not the channel parameter of the BS has been changed, and updates a channel parameter, changed as a result of the determination, through the DCD/UCD messages. Profile information related to the coding and modulation scheme of an uplink burst, a CDMA code set according to each ranging type, a back-off time applied when a collision occur after MSs transmit codes, etc. are defined in the UCD message.

The BS assigns ranging regions to MSs through an UL MAP information element included in an UL MAP on a contention basis. Here, the ranging regions are divided into an initial/handover ranging region and a periodic/bandwidth request ranging region depending on the type of ranging and assigned.

The MS randomly selects a ranging code suitable for its purposes from the CDMA code set for each ranging type that has been obtained from the UCD message and transmits the selected ranging code to each uplink section assigned for ranging.

For example, an MS which performs initial ranging selects a specific code from a CDMA code set for the initial ranging that has been obtained from an UCD message and requests the initial ranging from a BS by transmitting the specific code to the BS through an initial/handover ranging region.

In the case of periodic ranging, an MS selects a specific code from a CDMA code set for the periodic ranging and requests the periodic ranging by transmitting the specific code through a periodic/bandwidth request ranging region.

If a CDMA code for periodic ranging is received through an initial/handover ranging region, a BS can check that an idle mode MS requests ranging for a network reentry.

Next, the BS transmits a ranging response message (RNG-RSP), including the code received from the idle mode MS, to the idle mode MS (S340). The ranging response message transmitted by the BS includes a state ('continue' or 'success') for the ranging request of the idle mode MS. The ranging response message further includes the code transmitted by the idle mode MS.

Next, the idle mode MS that has received the ranging response message from the BS checks a ranging status and transmits a ranging code to the BS until the ranging status 'success' is received from the BS if, as a result of the check, the ranging status is 'continue'.

More particularly, if the BS that has received the ranging code from the idle mode MS through a ranging region determines that the idle mode MS needs to further adjust uplink synchronization, the BS transmits the ranging response message in which 'continue' has been set in the ranging status to the idle mode MS. Here, the ranging response message further includes a transmission power adjustment value, a time and frequency adjustment value, and information indicating a ranging status (success or fail) for uplink synchronization.

The idle mode MS that has received the ranging response message in which 'continue' has been set in the ranging status from the BS selects one (or two) codes from a CDMA code set and requests ranging again from the BS by transmitting the one (or two) codes to the BS through a ranging region.

If the BS that has received the ranging code from the idle mode MS through the ranging region determines that the idle mode MS no longer needs to adjust uplink synchronization, the BS transmits the ranging response message in which 'success' has been set in the ranging status to the idle mode MS.

Next, the BS assigns a grant enough for the idle mode MS to transmit a ranging request message (RNG-REQ) to the idle mode MS (S350).

More particularly, after transmitting the ranging response message in which 'success' has been set in the ranging status to the idle mode MS, the BS assigns uplink resources, that is, a time-frequency region, to the idle mode MS through CDMA_Allocation_IE included in the UL MAP so that the idle mode MS can transmit the ranging request message. Here, the BS assigns a sufficiently great resource region so that the idle mode MS can include TLVs related to a network reentry in the ranging request message.

Next, the idle mode MS transmits a ranging request message to the BS based on the grant assigned by the BS (S360).

More particularly, the idle mode MS transmits the ranging request message, including its own MAC address and TLVs related to a network reentry, such as a paging controller ID TLV, a ranging purpose indication TLV, and an HMAC/CMAC tuple TLV, to the BS through the region assigned by the BS.

In response to the ranging request message received from the idle mode MS, the BS transmits a ranging response message to the idle mode MS (S370). Here, the ranging response message includes management CIDs and various TLVs related to a network reentry, such as a paging controller ID TLV and an HMAC/CMAC tuple TLV.

Here, the BS exchanges context of the idle mode MS and the BS with the paging controller between the steps S360 and S370.

A method of distributing random access by MSs when a network (re)entry procedure is performed, which is proposed by an embodiment of the present invention, is described below. In particular, a random access distribution method for M2M devices in an idle mode is described in more detail.

First embodiment

The first embodiment provides a method in which M2M devices in an idle mode perform random access by assigning back-off window size information for the M2M devices.

Figure 4:
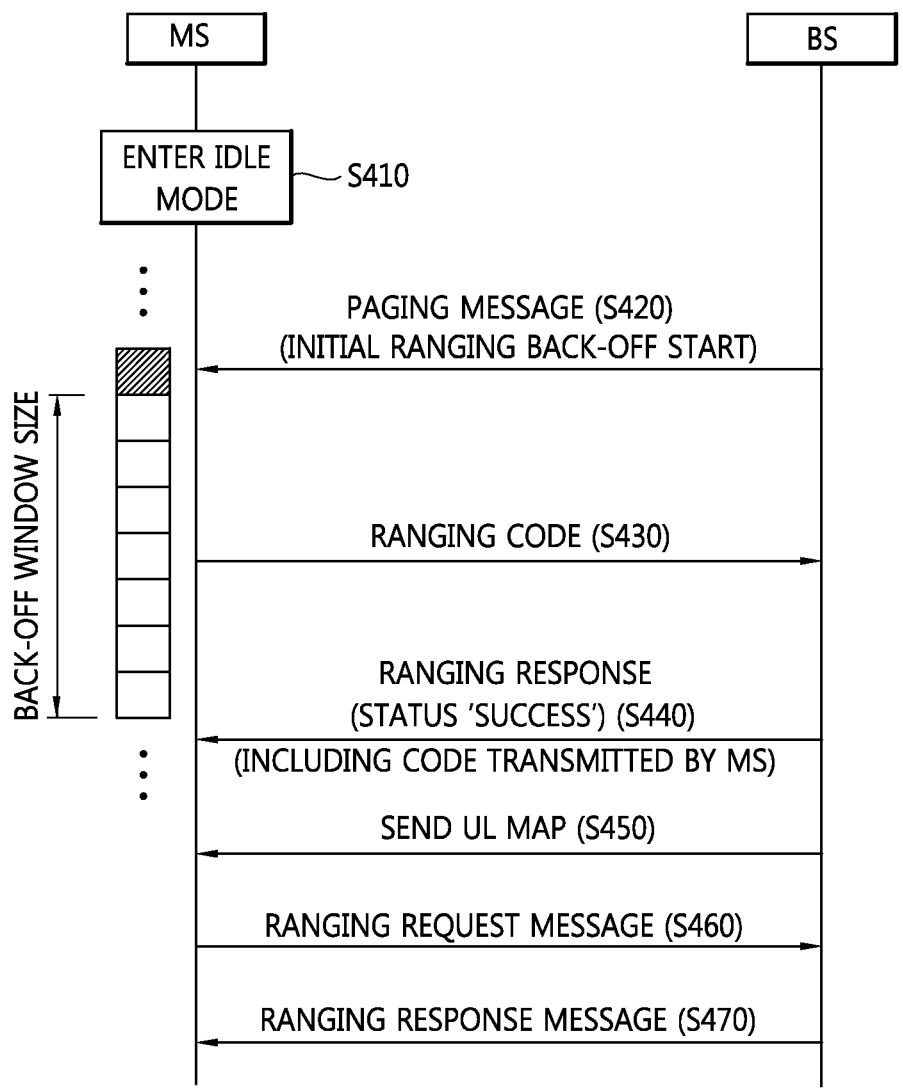
FIG. 4 is a flowchart showing a method in which M2M devices perform random access according to a first embodiment of the present invention.

FIG. 4 is a flowchart showing a method in which M2M devices perform random access according to a first embodiment of the present invention.

First, after performing a deregistration procedure with a BS, an MS (i.e., M2M device) enters an idle mode (S410).

Next, the idle mode MS receives a paging message from the BS during a paging listening interval (S420). Here, the paging message may also be represented as a paging advertisement message (MOB_PAG-ADV or AAI_PAG-ADV).

The paging message includes random back-off window-related information for M2M devices. Here, the random back-off window-related information can be a back-off window size that is separately transmitted from the BS to the M2M devices through the paging message or can be a back-off window size used in human type communication (HTC) devices. That is, the random back-off window-related information for the M2M devices that is included in the paging message may be identical with or different from back-off window-related information assigned through an UCD message.

That is, if the random back-off window-related information is separately included in the paging message for the M2M devices, the random back-off window-related information included in the paging message can be applied to only a random access procedure that is performed in response to the paging message.

More particularly, the random back-off window-related information may be an initial ranging back-off start field (or parameter) indicating an initial back-off window size for the M2M devices.

Here, the initial ranging back-off start field is included when an action code included in the paging message instructs a network reentry to be performed (e.g., the action code is set to '0b0').

Furthermore, the paging message further includes a ranging back-off window indicator field (or parameter) indicating an increase or decrease in the length of a ranging back-off window size for the random access of an MS. Here, the ranging back-off window indicator is included in the paging message when the initial ranging back-off start field is included.

More particularly, the ranging back-off window indicator field indicates that the ranging back-off window size is increased by a factor of 2 whenever an M2M device performs a ranging retry (e.g., the ranging back-off window indicator field is set to '0b0') or that the ranging back-off window size is decreased by a factor of 2 whenever an M2M device performs a ranging retry (e.g., the ranging back-off window indicator field is set to '0b1').

Furthermore, the BS can perform paging for each M2M device or for each M2M group.

Accordingly, if the BS performs paging for each M2M group, the BS can assign the initial ranging back-off start field and the ranging back-off window indicator to each M2M group. That is, if an M2M group ID (MGID) (or a multicast group ID) is included in the paging message, the initial ranging back-off start field and the ranging back-off window indicator are applied to M2M devices that belong to an M2M group included in the paging message.

Next, the idle mode MS transmits an initial ranging code to the BS in order to perform ranging according to a random back-off method using the ranging back-off window-related information included in the paging message (S430).

That is, the idle mode MS randomly selects a back-off value within the initial ranging back-off window size included in the paging message and transmits an initial ranging code for a network reentry, that is, for performing ranging, to the BS. Here, the initial ranging back-off window size is started from a frame (or subframe) subsequent to a frame (or subframe) in which the paging message has been received, as shown in FIG. 4.

Next, the BS transmits a ranging response message, including the code transmitted by the idle mode MS, to the idle mode MS (S440).

Here, if the idle mode MS has not received acknowledgement (ACK) for the initial ranging code, transmitted to the BS, from the BS (i.e., if a ranging process is started again), the idle mode MS retries to transmit the ranging code to the BS again based on the ranging back-off window indicator (by increasing or decreasing the back-off window size value exponentially).

Next, subsequent operations S450 to S470 for a network reentry, performed by the idle mode MS, are the same as the steps S350~S370 of FIG. 3.

Table 1 below shows an example of a paging advertisement message (AAI_PAG-ADV) format according to an embodiment of the present invention.

TABLE 1

| Field | Size (bits) | Value/Description | Condition |
|---|---|---|---|
| ... | ... | ... | ... |
| Action Code | 1 | Used to indicate the purpose of the AAI-PAG-ADV message 0b0: perform network reentry0b1: perform ranging for a location update | |
| If(Action Code=0b0){ | | | |
| Initial ranging backoff start | 4 | Indicate the initial backoff window size for M2M devices | |
| ... | ... | ... | ... |
| Ranging backoff window indicator | | 0b0: increasing the ranging backoff window size by a factor of 2 per every ranging retry0b1: decreasing the ranging backoff window size by a factor of 2 per every ranging retry as described in 6.2.18.7.2 | If Initial ranging backoff start field is present |
| For(i=0;i<Num_MGID; i++){ | | Num_MGID indicates the number of MGIDs included in this paging message[0 . . . 63] | Shall be included if the ABS transmits DL multicast data for M2M after transmission of the AAI-PAG-ADV message. |
| MGID | 15 | M2M Group ID | |
| Action Code | 2 | 0b00: Performing network reentry0b01: Performing a location update0b10: Receiving multicast traffic without requiring network reentry0b11: MGID re-assignment | |
| If(Action Code=0b00){ | | | |
| Initial ranging backoff start | | Indicate the initial backoff window size for M2M devices included in this group | |
| ... | ... | ... | ... |
| If(Action Code=0b11){ | | | |
| ... | ... | ... | ... |
| Ranging backoff window indicator | 1 | 0b0: increasing the ranging backoff window size by a factor of 2 per every ranging retry0b1: decreasing the ranging backoff window size by a factor of 2 per every ranging retry as described in 6.2.18.7.2 | If Initial ranging backoff start field is present |
| ... | ... | ... | ... |

Referring to Table 1, the initial ranging back-off start parameter indicates an initial back-off window size for M2M devices. The initial ranging back-off start parameter is included in the AAI_PAG-ADV message when an action code instructs a network reentry to be performed ('0b0').

The ranging back-off window indicator parameter indicates that the ranging back-off window size is increased ('0b0') or decreased ('0b1') by a factor of 2 whenever a ranging retry is performed.

The initial ranging back-off start parameter and the ranging back-off window indicator are included in the paging advertisement message when a BS performs paging for each M2M device or for each M2M group.

Here, if a BS performs paging for each M2M group, that is, an M2M MGID is included in the AAI_PAG-ADV message, the initial ranging back-off start parameter indicates an initial back-off window size for M2M devices that is included in the M2M group. Likewise, the initial ranging back-off start parameter is included in the AAI_PAG-ADV message if an action code instructs a network reentry to be performed ('0b00').

Second Embodiment

The second embodiment provides a method of distributing random access by idle mode MSs (in particular, idle mode M2M devices) by applying a ranging back-off waiting time when the idle mode MSs perform a network reentry procedure.

Figure 5:
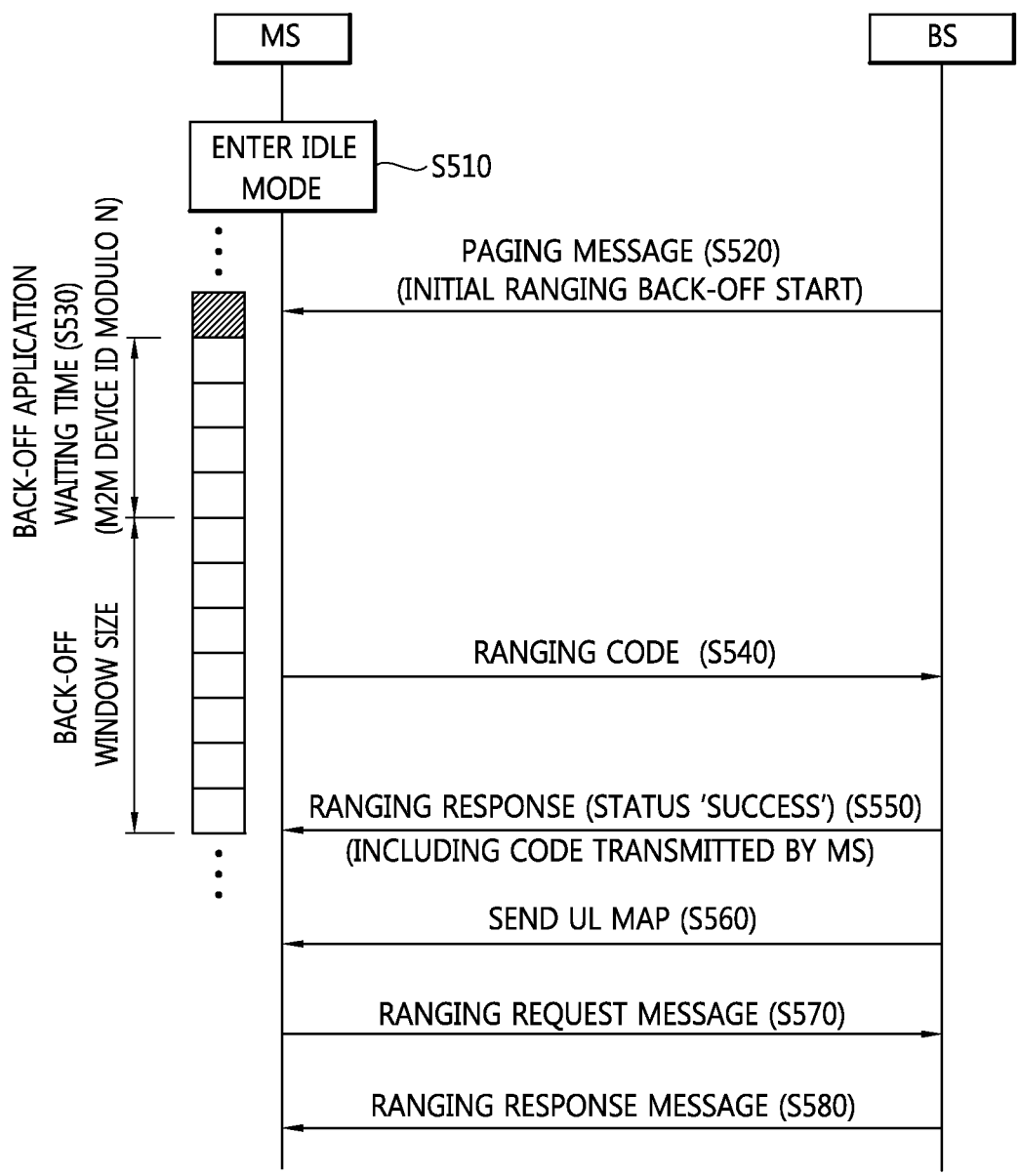
FIG. 5 is a flowchart showing a method of distributing random access by idle mode MSs according to a second embodiment of the present invention.

FIG. 5 is a flowchart showing a method of distributing random access by idle mode MSs according to a second embodiment of the present invention.

Steps S510, S520, and S550 to S580 are the same as the steps S410, S420, and S440 to S470 of FIG. 4, and only a difference between them is described.

An idle mode MS waits for a waiting time that is implicitly calculated according to Equation 1 below until it performs a random access process for a network reentry procedure (S520).

$$\text{M2M device ID modulo } N \qquad \text{<Equation 1>}$$

Equation 1 indicates an equation for calculating a waiting time until the idle mode M2M device performs a random access procedure, that is, until a back-off start point, after the idle mode M2M device receives a paging message from a BS. Here, a result value of an operation according to Equation 1 can be a value having a superframe unit, frame unit, or subframe unit.

An M2M device ID may be a value (e.g., deregistration identifier (DID)) assigned by the BS in order to identify an idle mode MS or may be an MS-unique MAC address or an MAC address hash value.

The N value is assigned to an MS by a BS through the capability negotiation process, through a network registration process, through an idle mode initiation process of an initial network entry procedure, or through a paging message during a paging listening interval in idle mode. The N value can be a natural number.

Here, the capability negotiation process can be performed by the transmission and reception of subscriber basic capability request/response messages (SBC-REQ/RSP). The network registration process can be performed by the transmission and reception of REG-REQ/RSP messages, and the idle mode initiation process can be performed by the transmission and reception of DREG-REQ/RSP messages.

Furthermore, the N value can be assigned to an M2M device in a network by taking the attributes of a subscriber to which an M2M device belongs and the number of MSs of a group (e.g., an M2M service or subscriber group) to which an M2M device belongs.

For example, if a result value of a modulo operation according to Equation 1 is '3' (a range of an operation result is 0~3), an idle mode M2M device applies a back-off window for random access after 3 frames (or subframes) from a frame (or subframe) subsequent to a frame in which a paging message is received from a BS. That is, the idle mode M2M device has a waiting time corresponding to the 3 frames until it applies the back-off window.

That is, the idle mode M2M device waits by the operation result value according to Equation 1 before performing a random access procedure (before transmitting an initial ranging code to the BS) and applies the back-off window with reference to an initial ranging back-off start parameter included in the paging message. Here, the back-off window size (or amount) is a maximum time during which the MS waits until it transmits a random access code after a random access waiting time is ended.

A back-off window value included in a secondary superframeheader subpacket information element 3 (S-SFH SP IE 3) may be used as the back-off window size.

Next, the idle mode MS randomly transmits an initial ranging code to the BS within the back-off window size in order to perform random access (S530).

According to the above-described process, if a plurality of idle mode MSs receives a paging message from a BS and performs a network reentry for the BS at the same time, ranging codes can be distributed and transmitted.

Third Embodiment

The third embodiment provides another method of distributing random access by idle mode MSs (in particular, M2M devices) by applying a ranging back-off waiting time when the idle mode MSs perform a network reentry procedure.

Figure 6:
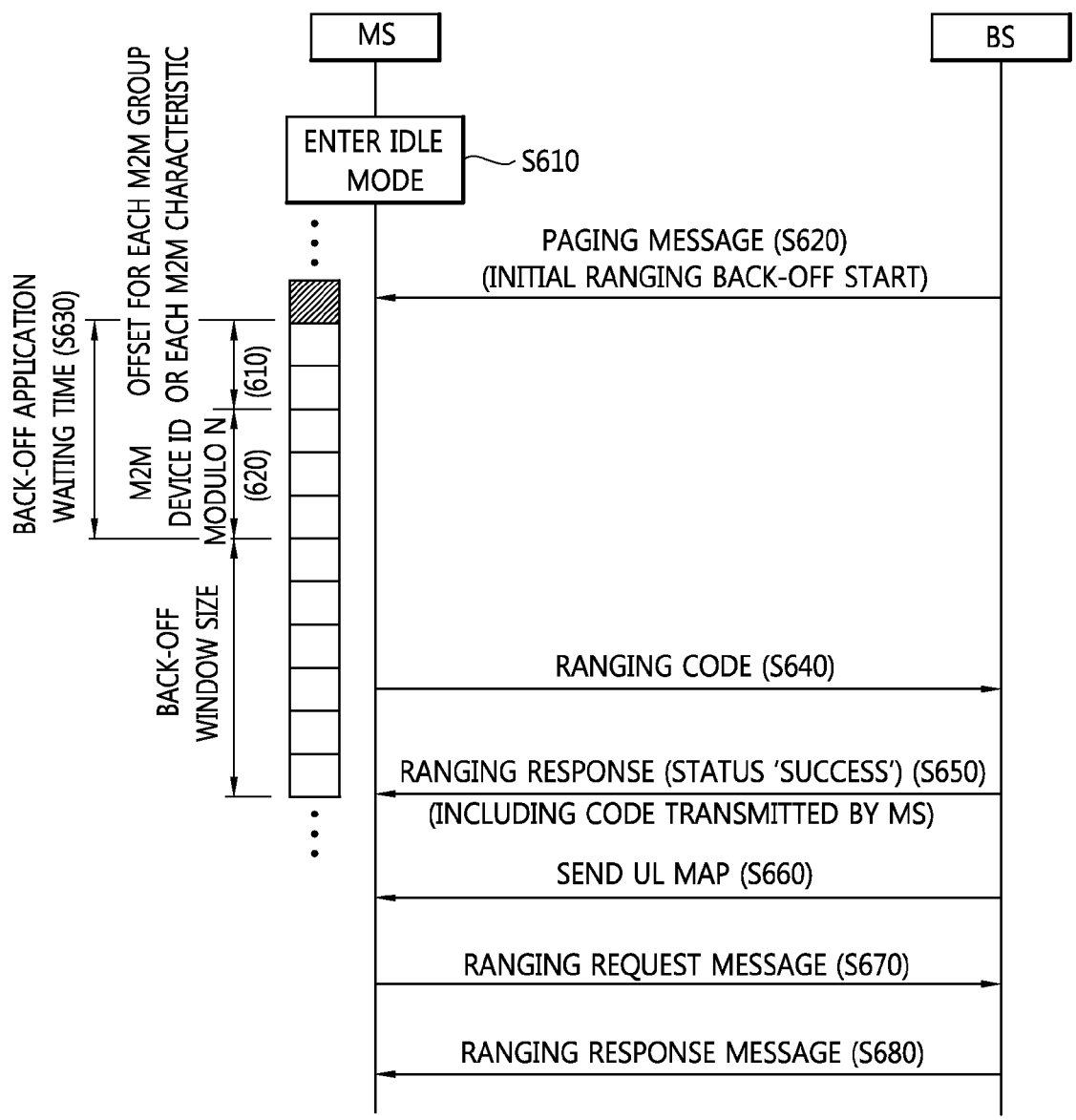
FIG. 6 is a flowchart showing a method of distributing random access by idle mode MSs according to a third embodiment of the present invention.

FIG. 6 is a flowchart showing a method of distributing random access by idle mode MSs according to a third embodiment of the present invention.

That is, FIG. 6 shows another method in which a point of time at which the back-off window of FIG. 5 is started (i.e., a waiting time until a ranging code is transmitted) is different. Accordingly, the steps of S610~S620 and S640~S680 are the same as the steps S510~S520 and S540~S580 of FIG. 5, and only a difference, that is, a step S630, between them is described in detail.

After receiving a paging message from a BS, an idle mode MS has a waiting time according to Equation 2 or Equation 3 below until it applies a back-off window (S620). That is, after receiving the paging message from the BS, the idle mode MS starts the back-off window in order to perform a random access procedure for the BS after an operation result value according to Equation 2 or Equation 3, that is, a back-off window waiting time.

As shown in FIG. 6, a back-off application waiting time (or waiting time) (S630) includes an offset interval 610 for each M2M group or each M2M application and an M2M device ID modulo N operation value interval 620.

(Offset per M2M group)+(M2M device ID modulo N)  <Equation 2>

(Offset per M2M application type)+(M2M device ID modulo N)  <Equation 3>

Here, the BS can transfer paging indication for MSs belonging to one or more M2M groups through the paging message. In this case, the BS can differently set a waiting offset value to each M2M group according to Equation 2 in order to avoid a collision for random access between the M2M groups.

Here, the M2M groups may be the same application type or may be different application types.

Furthermore, a back-off application waiting time (waiting offset value) according to Equation 2 or 3 can be previously transferred to an MS through a network entry process or an idle mode entry (or initiation) process.

If an M2M group is formed depending on a characteristic of an M2M application type (e.g., a time tolerant application is set to a value smaller than a value set to a time intolerant application), a different waiting time may be set according to each application type irrespective of an M2M group in order to differently set ranging priority according to each M2M application type.

That is, the application of a back-off window by the idle mode MS according to the third embodiment (i.e., the transmission of an initial ranging code) can be started after the time of 1 or 2 below after the paging message is received.

1. (Offset per M2M group)+(M2M Device ID modulo N)+random back-off value
2. (Offset per M2M application type)+(M2M Device ID modulo N)+random back-off value The random back-off window in the 1 or 2 can have the same value as that of a human type communication (HTC) device as described in the first embodiment, or an additional back-off window for an M2M device can be used as the random back-off window.

The embodiment of the present invention and their modifications can be combined. Therefore, each embodiment can be implemented in combination as well as in its own. These combinations may be obvious to those skilled in the art from the description of the specification, and so detailed description thereof is omitted. Although the description on the combination has not been included in the specification, those combinations of embodiments shall be interpreted to be within the scope of the present invention.

The above-described embodiments and modifications may be made by various means, for example, in hardware, firmware, software, or in a combination thereof.

When implemented in hardware, the methods according to the embodiments of the present invention may be embodied by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

When implemented in firmware or software, the methods according to the embodiments of the present invention may be embodied in modules, procedures or functions that perform the above-described functions or operations. The software codes may be stored in a memory unit and driven by a processor. The memory unit may be positioned in or outside of the processor and may transmit or receive data to/from the processor by various known means.

For example, the methods according to the embodiments of the present invention may be stored in a storage medium (for example, an internal memory, a flash memory, a hard disk, etc.) and may be implemented as codes or commands in a software program that may be executed by a processor (for example, a microprocessor). This will be described with reference to FIG. 7.

Figure 7:
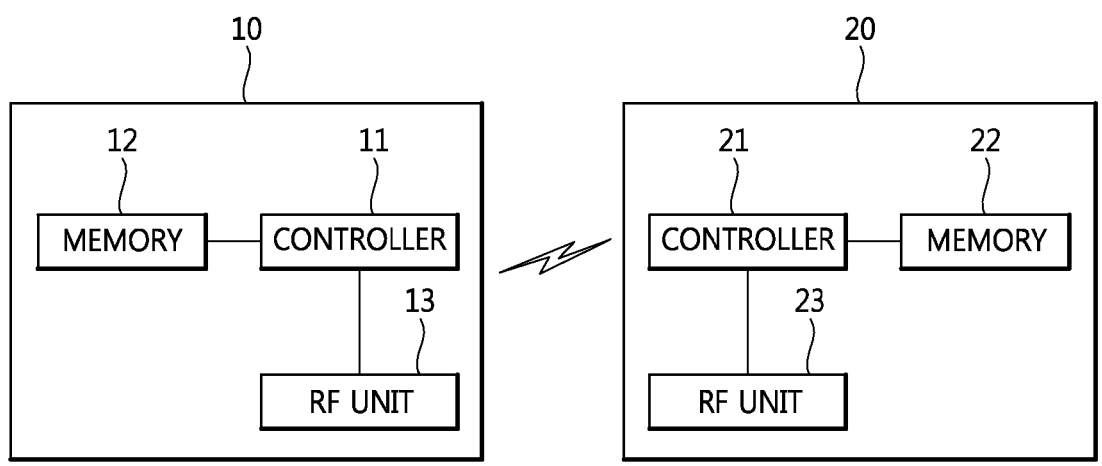
FIG. 7 is a block diagram showing internal structures of an MS and a BS in a wireless access system according to an embodiment of the present invention.

FIG. 7 is a block diagram showing internal structures of an MS and a BS in a wireless access system according to an embodiment of the present invention.

An MS 10 includes a controller 11, a memory 12, and a radio frequency (RF) unit 13.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20 includes a controller 21, a memory 22, and an RF unit 23.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

What is claimed is:

1. A method of performing, by a mobile station (MS), a network reentry procedure in an idle mode in a wireless access system, the method comprising:
receiving control information indicating an initial ranging back-off window size for machine-to-machine (M2M) devices from a base station (BS) during a paging listening interval;
determining the initial ranging back-off window size for an initial ranging using the received control information;
randomly selecting a back-off value within the determined initial ranging back-off window size for network access; and
transmitting an initial ranging code for the network access,
wherein the control information is an initial ranging back-off start parameter,
wherein the control information is received through a paging advertisement message (MOB_PAG-ADV or AAI_PAG-ADV),
wherein the control information is assigned to each M2M group in a plurality of M2M groups and indicates an initial ranging back-off window size for M2M devices belonging to each of the plurality of M2M groups, and
wherein an M2M group ID (MGID) is transmitted with the paging advertisement message to identify each M2M group in the plurality of M2M groups.

2. The method of claim 1 further comprising:
receiving a response to the initial ranging code from the BS;
receiving an assigned grant for transmitting a ranging request message (RNG-REQ) from the BS;
transmitting the ranging request message to the BS based on the assigned grant; and receiving a ranging response (RNG-RSP) message as a response to the ranging request message from the BS.

3. The method of claim 1 further comprising:
calculating a waiting time until the initial ranging back-off window size is applied, and
applying the determined initial ranging back-off window size after the calculated waiting time.

4. The method of claim 3, wherein the waiting time is calculated through a modulo operation of an M2M device ID and a specific value (N) assigned by the BS.

5. The method of claim 4, wherein the waiting time is calculated according to an equation below:

M2M device ID modulo N.

6. The method of claim 3, wherein the waiting time is a sum of an offset for each M2M group or for each M2M application type and a value of a modulo operation of an M2M device ID and a specific value (N) assigned by the BS.

7. The method of claim 6, wherein the waiting time is calculated according to an equation below:

(Offset per M2M group)+(M2M device ID modulo N)

or (Offset per M2M application type)+(M2M device ID modulo N).

8. The method of claim 1, wherein the MS is an M2M device or a machine type communication (MTC) device.

9. A mobile station (MS) for performing a network reentry procedure in an idle mode in a wireless access system, the MS comprising:
a radio frequency unit for transmitting and receiving wireless signals with an outside; and
a control unit connected to the radio frequency unit,
wherein the control unit is configured for:
controlling the radio frequency unit to receive control information indicating an initial ranging back-off window size for machine-to-machine (M2M) devices from a base station (BS) during a paging listening interval;
determining the initial ranging back-off window size for an initial ranging using the received control information;
randomly selecting a back-off value within the determined initial ranging back-off window size for network access; and
transmitting an initial ranging code for the network access,
wherein the control information is an initial ranging back-off start parameter,
wherein the control information is received through a paging advertisement message (MOB_PAG-ADV or AAI_PAG-ADV),
wherein the control information is assigned to each M2M group in a plurality of M2M groups and indicates an initial ranging back-off window size for M2M devices belonging to each of the plurality of M2M groups, and
wherein an M2M group ID (MGID) is transmitted with the paging advertisement message to identify each M2M group in the plurality of M2M groups.

10. The MS of claim 9, wherein the control unit is configured for calculating a waiting time until the initial ranging back-off window size is applied, and
applying the determined initial ranging back-off window size after the calculated waiting time.

* * * * *